United States Patent [19]

Blumstein et al.

[11] Patent Number: 4,617,371
[45] Date of Patent: Oct. 14, 1986

[54] NOVEL POLYMERIC LIQUID CRYSTALS AND METHODS FOR THEIR PREPARATION

[75] Inventors: Alexandre Blumstein, 2 Regina Dr., Chelmsford, Mass. 01824; Jawed Asrar, Lowell, Mass.

[73] Assignee: Alexandre Blumstein, Chelmsford, Mass.

[21] Appl. No.: 445,081

[22] Filed: Nov. 29, 1982

[51] Int. Cl.[4] .................... C09K 19/52; G02F 1/13; C08G 63/16
[52] U.S. Cl. .............. 528/194; 252/299.01; 350/350 R
[58] Field of Search .......... 252/299.01, 299.6, 299.66, 252/299.67, 299.68; 428/1; 528/194

[56] References Cited

U.S. PATENT DOCUMENTS

| | | | |
|---|---|---|---|
| 3,355,513 | 11/1967 | Sadron et al. | 252/299.01 |
| 4,070,912 | 1/1978 | McNaughtan | 252/299.01 X |
| 4,293,435 | 10/1981 | Portugall | 252/299.01 |
| 4,332,759 | 6/1982 | Ide | 428/1 |
| 4,384,016 | 5/1983 | Ide et al. | 428/1 |
| 4,388,453 | 6/1983 | Finkelmann et al. | 252/299.01 X |
| 4,410,570 | 10/1983 | Kruezer et al. | 252/299.01 X |

FOREIGN PATENT DOCUMENTS 0091253 10/1983 European Pat. Off. .

OTHER PUBLICATIONS

Krigbaum et al., "A Polyester Forming . . . ", Mol. Cryst. Liq. Cryst. 1981, vol. 76, pp. 79–91.
Blumstein and Thomas, "Odd–Even Effect . . . ", Macromolecules, 1982, 15, 1264–1267.
Blumstein et al., "Oriented Polymer Growth . . . ", Macromolecules, 1975, vol. 8, No. 1, Jan.–Feb.

*Primary Examiner*—Teddy S. Gron
*Assistant Examiner*—Catherine S. Kilby
*Attorney, Agent, or Firm*—Hamilton, Brook, Smith & Reynolds

[57] ABSTRACT

Polymeric liquid crystals which retain their mesomorphic structure and properties associated therewith at temperatures below their glass transition temperature are described. The polymers contain mesogene and spacer units in alternating sequence in the main chain and may carry aliphatic substituents.

2 Claims, No Drawings

NOVEL POLYMERIC LIQUID CRYSTALS AND METHODS FOR THEIR PREPARATION

DESCRIPTION

1. Technical Field

This invention is in the field of polymers, and particularly relates to polymeric liquid crystals.

2. Background Art

Liquid crystals are materials which exhibit dual physical characteristics, some associated with liquids and others associated with solids. Liquid crystals exhibit viscosities, for example which are ordinarily associated with liquids. The properties of optical scattering and transmission of liquid crystals, however, are similar to those of solids. In liquids, the molecules are randomly distributed and oriented. In crystalline solids, molecules are generally rigidly oriented and arranged in a specific crystalline structure. Liquid crystals resemble solid crystals in that the molecules of liquid crystalline substances are oriented in a fashion similar to that of crystalline solids.

Many substances have been found to exhibit liquid crystalline characteristics in a relatively narrow temperature range; but below such temperature ranges the substances typically appear as crystalline solids, and above such temperature ranges they typically appear as isotropic liquids. Because these phase transitions are generally induced by varying temperature, such liquid crystalline substances are often referred to as thermotropic.

There are three different forms of liquid crystals: the smectic, nematic and cholesteric forms. These structural forms are sometimes referred to as mesophases and substances which give rise to liquid crystalline mesophases are called mesogenes. Mesophases are states of matter intermediate between the isotropic liquid and crystalline states. The three mesophase forms of liquid crystals are characterized by different physical structures in which the molecules are arranged in a manner unique to each. The three structures are well known in the liquid crystal art.

In the first form, the smectic, the molecules are most highly ordered. They arrange themselves into discrete parallel layers; all the molecules in one layer are parallel to one another, and the molecules in different layers all point in the same direction.

In the second form, the nematic, the molecules arrange themselves with their long axes parallel to one another but take up random positions along their axes with respect to adjacent molecules.

In the third form, the cholesteric, the molecules all point in the same direction in each layer, but because of the assymetry and steric nature of the molecules, the direction of the long axes of the molecules in each layer is displaced slightly from the corresponding direction in adjacent layers so that over a large distance a continuous twist is superimposed upon the parallel arrangement. If the layers are observed from above, the molecules beneath a single point appear to be arranged in a helical structure. This helix has a pitch, which is the distance of one full rotation of the molecules. Under certain conditions, substantially all of the helices may be oriented so that they are perpendicular to the plane of the cholesteric substance but parallel to each other throughout. This arrangement forms what is known as a Grandjean texture. Such uniformly oriented textures exhibit a regularity of properties such as iridescence.

Because of this helical structure, cholesteric liquid crystals exhibit certain optical properties, of which the most remarkable is iridescence. The iridescene is due to the selective reflection of light and is directly related to the pitch of the helix of the cholesteric liquid crystal by the relation:

$$\lambda_p = \bar{n} p$$

where p is the pitch, $\bar{n}$ is the average index of refraction and $\lambda_p$ is the reflected wavelength of light. The color of reflected light may be altered by changing the pitch of the cholesteric helix. The pitch of the helix is very sensitive to temperature, pressure, electric or magnetic fields and the chemical environment. This sensitivity gives rise to a number of uses for cholesteric liquid crystals in devices such as transducers, sensors and memory devices in industry and medicine.

At temperatures above its isotropic liquid/liquid crystal transition temperature, a liquid crystalline substance is an isotropic liquid. When cooled to temperatures below the isotropic liquid/liquid crystal transition temperature, the liquid crystalline substance enters its mesophase and forms a smectic, nematic or cholesteric structure depending upon its nature.

If cooled further, the liquid crystalline substance crystallizes, losing its liquid crystalline structure and the properties associated therewith. Low molecular weight liquid crystals quickly crystallize when cooled to room temperature, and the properties of the liquid crystal disappear rapidly. Most high molecular weight liquid crystals (e.g. polymeric liquid crystals), although they crystallize more slowly than do low molecular weight liquid crystals, nevertheless lose the properties of liquid crystals are lost when cooled to room temperature.

A shorthand notation is commonly used to describe the two transition temperatures. For example, such a notation might read K100CH200I. This example notation indicates the liquid crystal it describes has cholesteric properties in the temperature range from 100° C. to 200° C. (the mesophase). Below 100° C., the liquid crystal substance is subject to crystallization destructive of its cholesteric texture; above 200° C., the substance is isotropic.

The most common technique for extending the temperature range over which a liquid crystalline substance displays desired properties of liquid crystals is a technique called quenching. Quenching is accomplished by rapidly cooling the liquid crystalline substance by contacting the substance with a chilled liquid or gas or a cold solid surface. If a polymeric liquid crystal, for example, is cooled rapidly to room temperature, the normally occurring crystallization which causes destruction of the liquid crystalline order takes place at an infinitely slow rate. In essence, the crystallization is bypassed, and the liquid crystalline substance is fixed in its mesomorphic phase. In cholesteric polymeric liquid crystals which have undergone quenching, the cholesteric texture which is responsible for properties such as iridescence may be retained in the solid or glassy state. Liquid crystals created by quenching, however, are often prone to damage by elevated temperature or by temperature cycling.

There has been much interest in the synthesis of polymeric liquid crystals because polymeric liquid crystals are expected to have applications similar to those of low molecular weight liquid crystals while possessing the particular advantages of polymers. Polymeric liquid crystals, because of superior mechanical properties, for example, may be especially useful in fibers or coatings.

The synthesis of polymeric liquid crystals is complicated by the fact that thermotropic phase transitions are often located at or above the thermal decomposition temperature of the polymer. While Blumstein et al., *Macromolecules* 8: 73 (1975), recognized that in some polymers there exists a thermotropic liquid crystalline order similar to that found in low molecular weight liquid crystals, Finkelmann et al. German Offen. No. 27 22589 (1978), synthesized what appears to be the first cholesteric and nematic liquid crystalline polymers having a thermotropic phase transition temperature well below the decomposition temperature of the polymer. These polymers were synthesized by copolymerizing two different vinyl monomers to which was attached a mesogenic moiety at the end of a flexible spacer moiety. In the case of cholesterics, at least one of the monomers contained a chiral center. The flexible spacer with attached mesogenic group formed sidechains linked to the backbone of the resulting vinyl polymer. Thus, the cholesteric properties of the polymer depended upon the sidechains. The polymers formed spontaneously cholesteric Grandjean textures when heated in a thin layer between a slide and coverslip.

These polymers, however, have the disadvantages of high viscosities, high molecular weight, and relatively slow relaxation times, and further they are difficult to orient, either in a magnetic field or in a hydrodynamic field of shear.

Blumstein et al., *Proceeding of the Conference on Liquid Crystals of One and Two-dimensional Order and Their Applications*, Garmisch-Partenkirchen, W. Germany, Jan. 21-25, 1980, p. 252, W. Helfrich and G. Heppke, Eds., Springer-Verlag, New York, developed thermotropic cholesteric polymers of a different type. These investigators incorporated mesogenic groups and linear, flexible spacers into the mainchain of the polymer backbone. Such polymers had been known to exhibit upon heating, mesophases of smectic and nematic type. Blumstein et al., however, produced thermotropic cholesteric polymers by introducing an assymetric center into the flexible spacer groups. The polymers they synthesized were polyesters of 4,4'-dihydroxyazoxybenzene (the mesogenic group) with mixtures of dodecanedioic acid and chiral (+)3-methyladipic acid. The resulting linear polymers containing mesogenic and spacer groups in the mainchain remained stable at the cholesteric transition temperature (about 200° C.) yielding spontaneous Grandjean textures at that temperature. The pitch of the cholesteric helix varies with the increase in the content of the chiral (+)3-methyladipic acid unit. Later, Blumstein et al., *Mol. Cryst. Liq. Letters* 72: 1 (1981) synthesized polymers with a cholesteric phase transition temperature well below the decomposition temperature of the polymer. However, when cooled to room temperature, these polymers crystallize and lose their cholesteric texture and iridescence. In some cases, the liquid crystalline order may be preserved in the glassy state by the quenching procedure. Also, nematic polyesters based on 2,2' methylazoxybenzene mesogenic moiety (among others) and various flexible spacers based on alkanedioic acids have been prepared by Blumstein et al., *Macromolecules* 15: 1264 (1982).

Krigbaum et al., *Mol. Cryst. Liq. Cryst* 76: 79 (1981) synthesized a mesomorphic polyester from 4,4'-dihydroxy-methyl stibene and (+)3-methyladipic acid which exhibited a stable cholesteric mesophase between 199° C. and 282° C. The cholesteric texture of this polymeric liquid crystal could be preserved in the solid state by the rapid quenching procedure.

It is highly desirable to preserve a high degree of anisotropy and the properties associated with that state in nematic and cholesteric liquid crystalline substances at room temperature. And it is particularly desirable to achieve this for polymeric liquid crystalline substances, because the advantageous properties inherent to nematic and cholesteric liquid crystals are then combined with the superior mechanical properties of polymers. But from the teachings of the prior art, it is impossible to determine what types of structural moieties may be assembled into polymers to produce polymeric liquid crystals of either the nematic or cholesteric type which resist destructive crystallization and retain their oriented nematic or cholesteric order at temperatures below the glass transition temperature of the polymer.

INVENTION

The invention relates to thermotropic smectic, nematic and cholesteric liquid crystals which resist crystallization destructite of mesomorphic structure and the desirable properties associated therewith when cooled to room temperature, and to methods of synthesizing such liquid crystals. The cholesteric polymeric liquid crystals prepared by the method of this invention spontaneously form uniformly-oriented Grandjean textures and they retain their uniformly oriented cholesteric texture and their full characteristic iridescence when cooled to room temperature regardless of their crystalline/cholesteric phase transition temperature. Also, the cholesteric texture of these liquid crystalline polymers may be preserved even when they are cooled to room temperature slowly, thus eliminating the need for rapid quenching. Similarly, the mesomorphic order of smectic and nematic liquid crystalline substances prepared according to the method of this invention may also be preserved or fixed in the glassy state upon slow cooling to room temperature.

The polymeric liquid crystals of this invention may also be crosslinked while in their mesophase. Such crosslinked polymers retain their mesomorphic structure, either smectic, nematic or cholesteric depending upon the nature of the polymer, when cooled below the glass transition temperature of the polymer. These crosslinked polymers, however, maintain their mesomorphic structure despite subsequent elevation of temperature or temperature cycling.

The polymeric liquid crystals of this invention are synthesized by reacting mesogenic and spacer monomers having certain substituent groups to form polymers with mesogenic moieties separated by flexible spacer segments. The mesogenic moieties and the flexible spacers are in the main chain of the polymer. The substituent groups may be in either the mesogenes or the spacers, or both, and may be groups such as methyl, ethyl propyl or butyl groups. Either the mesogenes or the spacers, or both, must be chiral in order to obtain cholesteric polymers. Thus, the substituents groups are positioned in the mesogenic or spacer moieties such that the monomers are assymetric, that is, have at least one chiral center which may be either in the mesogene or spacer of the polymer. To obtain nematic polymers non-chiral or a racemic mixture of chiral, mesogenes and spacers are used.

The mesogenic monomers may be selected from any suitable class of mesogene compounds, including but not limited to compounds such as bisphenols and cholesterol esters. Compounds of the following formulae are preferred:

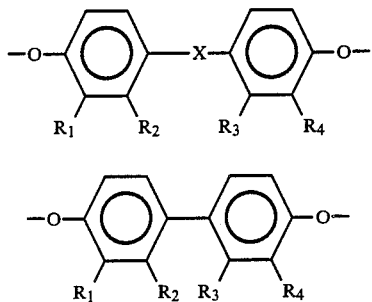

where,

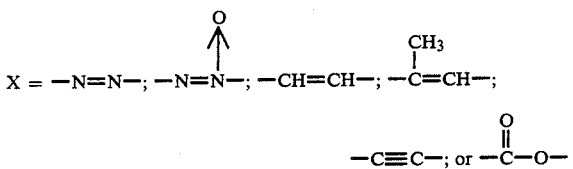

and where $R_1$, $R_2$, $R_3$ and $R_4$ are H, $CH_3$, $C_2H_5$, $C_3H_7$ or $C_4H_9$, that is they represent various combinations of hydrogen and small aliphatic groups such as methyl and ethyl groups. Propyl, butyl and other aliphatic groups may also be used as determined by routine experimentation. At least one of the R groups must be a short-chain aliphatic group.

The spacer moieties may be any compounds having a flexible hydrocarbon chain with terminal functional groups at both ends of the chain that will react, under appropriate reaction conditions, to form linkages with the mesogenic monomers. For example, where the mesogenic monomers of the above formulae contain para-substituted hydroxyl groups, suitable spacer monomers may be selected from compounds which would undergo a condensation react to form ester linkages with the mesogenic diols, such as aliphatic diacids of the following general formula:

$$HOOC-(CH_2)_n-COOH$$

where n is between about 2 and about 25.

Aliphatic diacids having an olefinic double bond such as, for example, fumaric acid, transtraumatic acid or trans-3-hexene-1,6-dioic acid may also be used. Trans-isomers are preferred for such compounds; cis-isomers would likely introduce a "kink" in the molecule which would be detrimental to cholesteric properties.

Aliphatic diacids having assymetric (chiral) carbon atoms also may be used. These include compounds such as 3-methyl-adipic acid or 3-tertiary-butyl-adipic acid.

A chiral molecule may be classified as D or L, depending on how the various groups are oriented about the assymetric carbon atom. If chiral compounds are used, then racemic mixtures of D and L isomers should be avoided; that is, relatively pure D isomers or relatively pure L isomers should be used. Diacids having two or more assymetric atoms may also be used, such as 3,4-dichloroadipic acid, 2,4-dimethyl glutaric acid, 2,6-dibromoheptanedioic or 2,5-dimethyladipic acid.

It is suspected that, if such compounds are used, the assymetric carbon atoms should be oriented in the same way to form either D, D or L, L compounds; in other words, D, L isomers should be avoided. However, this may not hold true for all compounds. Compounds with two or more assymetric carbon atoms may be selected and evaluated for the purposes of this invention by those skilled in the art.

It should be noted that the liquid crystalline polymers of the present invention are not limited to polyesters. For example, polyamides could be formed by condensing rigid moieties such as mentioned on page 10, lines 19–20 wherein oxygen is replaced by a secondary amine with aliphatic acid chlorides. Also polyelectrolytic polymers may be synthesized via a quarternization reaction, wherein an aliphatic diacid halogenate or an aliphatic dihalogen forms ionic bonds with terminal tertiary amino groups on the mesogene.

To synthesize the polymeric liquid crystals of this invention, mixtures of the various spacer monomers are reacted with the mesogenic monomers in stoichiometric proportions. When mesogenic diols are reacted with a mixture of alkane, alkene and chiral dioic acids under appropriate conditions, linear polyesters which display spontaneous iridescent Grandjean textures at various temperatures are obtained. The polymers are easy to supercool, and they retain their cholesteric texture at room temperature. The polymers show various iridescent colors in the cholesteric state depending upon their nature and retain the color when cooled to room temperature.

It is suspected that the attached substituent groups by steric hindrance interfere with crystallization of the polymeric liquid crystal, as they are cooled to temperatures below their glass transition temperature. The crystallization destructive of mesomorphic order is thereby avoided and the liquid crystalline order preserved in the glassy state. The inventors propose the mechanism without being bound by it.

The polymeric liquid crystals of this invention may be prepared so that they contain sites for crosslinking. The polymeric liquid crystals so prepared spontaneously form uniform cholesteric textures and may be subjected to a crosslinking reaction in the cholesteric phase. The crosslinked polymeric liquid crystals form permanently oriented cholesteric rubbers or glasses in which the iridescent Grandjean texture is fixed or "locked in" permanently, and thus resistant to temperature changes.

To form the crosslinked cholesteric, polymeric liquid crystals of the invention, mesogenic monomers containing assymetrically placed substituent groups are reacted with spacer monomers that have sites for crosslinking with other spacer groups or with the mesogenes, such as the spacers having olefinic double bonds described above. In the case of cholesteric polymers, the spontaneously formed Grandjean texture is subjected to a crosslinking reaction while in the cholesteric phase. Smectic or nematic polymers also are subjected to the crosslinking reaction while in their mesophase.

The cross-linking can be induced by a variety of means. For example, electron or ultra-violet radiation may be used to cross-link relatively thin films; x-rays and gamma radiation are suitable for cross-linking liquid crystals with greater thickness. Various other chemical means might also be suitable to cause cross-linking.

After the cross-linking operation is complete, the polymeric liquid crystals are cooled to a desired temperature, such as room temperature. The cross-linking bonds tend to constrain the linear polymeric molecules within a desired cholesteric or nematic orientation. The liquid crystals created in this manner are relatively strong, permanent, and resistant to destructive crystallization and temperature changes. Coatings or films prepared from these polymeric liquid crystals, in which the crosslinking destroys the crystallization tendency, become permanently oriented cholesteric (or smectic or nematic depending on the nature of the liquid crystal) rubbers or glasses in which the iridescent Grandjean texture is "locked-in" irrespective of temperature.

EXAMPLE 1

1.0942 grams (0.00424 moles) of 4,4'-dihydroxy-2,2'-dimethylazoxybenzene, 0.3391 (0.00848 moles) of NaOH, 0.1930 of benzyltriethyl ammonium chloride, 42 ml of distilled water and 38 ml of 1,2-dichloroethane were mixed and placed in a blender. The blender was stirred at medium speed 0.7016 (0.00265 moles) of trans-traumatoyl chloride and 0.3155 (0.00159 moles) of (+)3-methyladipoylchloride were mixed in 25 ml of 1,2-dichloroethane and added to the blender. The speed of the blender was turned to the maximum for 5 minutes. The resulting slurry was precipitated in 500 ml of ethanol to create a fibrous polymer. The polymer was filtered, dissolved in chloroform, filtered again, precipitated into acetone, filtered and dried in a vacuum oven at 50° overnight.

The resulting polymer had a very low crystallinity, and the transition temperature is K75CH208I. The polymer showed violet-to-blue color in the cholesteric phase; this color was retained on cooling to room temperature. DSC thermograms did not show the K-CH transition because of the suppressed crystallinity; however, the CH-I transition was unchanged.

A variety of other polymers were created with different ratios of (+)3-methyladipic acid (MAA) and trans-traumatic acid (TTA). Each of the polymers synthesized by the method described above showed iridescent colors in the cholesteric state, from red-to-violet depending upon the ratio of MAA to TAA, as shown in Table 1. The color of the cholesric phase in all cases was retained when the polymer was cooled to room temperature. No fast quenching or other special treatment was necessary to prevent destructive crystallization.

TABLE 1

| No. | Wt. fraction $\left(\dfrac{MAA}{TTA}\right)$ | Color | t° C. K CH | t° C. CH I |
|---|---|---|---|---|
| 1 | 37.6/62.4 | 0.46 Blue-violet | 75 | 208 |
| 2 | 36.2/63/8 | 0.78 Green-yellow | 82 | 216 |
| 3 | 31.6/68.4 | 0.71 Green-orange | 77 | 220 |
| 4 | 22.6/77.4 | 0.66 Orange-red | 80 | 212 |

EXAMPLE 2

A mixture of 1.9552 grams (0.00757 moles) of 2,2'-dihydroxy-3,3'-dimethylazoxybenzene, 0.6057 grams (0.01514 moles) of NaOH, 0.3449 grams of benzyltriethyl ammonium chloride, 75 ml of water and 70 ml of 1,2-dichloroethane was placed in the blender. The blender was stirred at medium speed. A solution of 0.6461 grams (0.00328 moles) of (+)3-methyladipoyl chloride and 0.9661 grams (0.0042 moles) of azeloyl chloride in 40 ml of 1,2-dichloroethane was added to the blender. The speed of the blender was increased to the maximum for 5 minutes. The resulting slurry was precipitated in 700 ml of ethanol. The polymer was filtered, dissolved in chloroform, filtered, precipitated in acetone, filtered and dried in a vacuum oven at 45° C. overnight. The polymer had a transition temperature of about K40CH154I. It showed a blue color in the cholesteric phase and the color was retained when the polymer film was cooled to room temperature.

EXAMPLE 3

1.0942 grams (0.00424 moles) of 4,4'-dihydroxyazoxybenzene, 0.3391 g (0.00848 moles) of NaOH, 0.1930 g of benzyltriethyl ammonium chloride, 42 ml of distilled water and 38 ml of 1,2-dichloroethane were mixed and placed in a blender. The blender was stirred at medium speed. 0.7016 g (0.00265 moles) of trans-traumatoyl chloride and 0.3155 g (0.00159 moles) of (+)3-methyladipic acid were mixed in 25 ml of 1,2-dichloroethane; this mixture was added to the blender. The blender was operated at maximum speed for five minutes at room temperature. The resulting slurry was precipitated in 500 ml of ethanol to create a fibrous polymer. The polymer was filtered, dissolved in chloroform, filtered again, precipitated into acetone, filtered and dried in a vacuum oven at 50° C. overnight.

The resulting polymer showed red irridescence in the cholesteric state. The color disappeared on cooling to room temperature, and reappeared upon heating above the K-CH transition temperature. The polymer was held in the cholesteric state at 210° C. and irradiated with ultraviolet radiation of a mercury arc lamp of 140 watts power at a distance of 30 centimeters for 30 minutes to cause crosslinking. Upon cooling to room temperature, the polymer retained red iridescence. It showed a transition temperature of K140CH, and decomposed at 290° C.

EXAMPLE 4

(a) An example of preparation of a permanently locked in nematic order in a polymeric liquid crystal can be obtained by repeating the procedure of Example 3 in every detail except by using exclusively the tran-straumatic acid chloride instead of a mixture of TTAC and MAA* as in Example 3.

(b) An example of preparation of a polymer with a nematic order at room temperature by bypassing the crystallization can be obtained by repeating the procedure of Example 1 or of Example 2 in every detail by using the racemic methyladipoylchloride instead of using the chiral methyladipoylchloride.

While the invention has been particularly shown and described with reference to preferred embodiments thereof, it will be understood by those skilled in the art that various changes in form and detail may be made therein without departing from the spirit and scope of the invention as defined by the claims.

We claim:

1. A cholesteric polymeric liquid crystalline compound comprising a linear polyester which is produced by condensing in substantially equimolar proportions 4, 4'-dihydroxy-2, 2'-dimethylazoybenzene with a mixture of trans-traumatoyl chloride and (+) 3-methyladipoyl-chloride.

2. A cholesteric polymeric liquid crystalline compound according to claim 1 wherein the molar ratio of trans-traumatoyl chloride and (+)3-methyladipoyl-chloride in the mixture is such that the cholesteric polymeric liquid crystalline compound has blue iridescence in the cholesteric phase.

* * * * *